United States Patent [19]

Snider et al.

[11] Patent Number: 5,703,625
[45] Date of Patent: Dec. 30, 1997

[54] ILLUMINATED PUSH BUTTON DISPLAY

[75] Inventors: Chris Ralph Snider; Kerwin Craig Osman, both of Kokomo, Ind.

[73] Assignee: Delco Electronics Corporation

[21] Appl. No.: 728,578

[22] Filed: Oct. 10, 1996

Related U.S. Application Data

[63] Continuation of Ser. No. 369,627, Jan. 6, 1995, abandoned.

[51] Int. Cl.$^6$ ............................................ G09G 5/00
[52] U.S. Cl. .............................. 345/168; 345/102
[58] Field of Search ............................ 345/168, 170, 345/102, 172, 184

[56] References Cited

U.S. PATENT DOCUMENTS

| | | | |
|---|---|---|---|
| 3,187,321 | 6/1965 | Kameny | 345/170 |
| 4,346,275 | 8/1982 | Iwakiri et al. | 200/314 |
| 4,441,001 | 4/1984 | Miyano et al. | 345/168 |
| 4,449,024 | 5/1984 | Stracener | 200/314 |
| 4,613,736 | 9/1986 | Shichijo et al. | 200/317 |
| 5,252,798 | 10/1993 | Kamada | 200/314 |

*Primary Examiner*—Mark R. Powell
*Assistant Examiner*—Matthew Luu
*Attorney, Agent, or Firm*—Jimmy L. Funke

[57] ABSTRACT

A graphic display is provided which is suitable for use in an instrument panel of an automobile. The graphic display includes a display lens and a number of backlit buttons which are formed by a unitary optically-conductive member, wherein both the display lens and the backlit buttons are illuminated by a single illuminated display located behind the unitary member. As such, the unitary member eliminates the requirement for a separately formed lens and buttons. Furthermore, the illuminated display generates graphics for both the display lens and the buttons, eliminating the requirement for insignia formed in the surface of the buttons and lights or light pipes behind the buttons for backlighting the buttons.

18 Claims, 2 Drawing Sheets

ILLUMINATED PUSH BUTTON DISPLAY

This is a continuation of application Ser. No. 08/369,627 filed on Jan. 6, 1995, now abandoned.

The present invention generally relates to illuminated graphic displays equipped with buttons for use in an instrument display panel. More particularly, this invention relates to a graphic display having an integrally-molded buttons and lens which utilizes a single illuminated display, and therefore reduces the complexity and cost of the display by eliminating the requirement for multiple light sources and separate components for performing the display and key functions.

BACKGROUND OF THE INVENTION

Illuminated graphic displays for automotive applications, such as the display module for an automobile's heating, cooling and air conditioning system, often include backlit buttons. The graphic display includes a lens through which the status of the system is displayed, while each backlit button has an insignia which identifies the particular function of the button as it relates to the information displayed on the graphic display. Such displays typically employ a vacuum fluorescent (VF), liquid crystal display (LCD) or light emitting diodes (LED) disposed behind the lens for generating the desired graphics, and an incandescent light positioned behind the buttons. Because the insignia must be visible in the dark, the buttons are typically formed from a light conducting material, i.e., transparent and translucent materials, and each insignia is delineated by removing a portion of an opaque layer covering the button. To enhance daytime viewing, the insignia are typically further defined by a translucent white layer beneath the opaque layer. The insignia are generated by removing portions of the opaque layer without removing the underlying white layer.

While graphic displays of the type described above are widely used, they have significant disadvantages. As an example, it is difficult to obtain suitable optical characteristics using insignias formed in the surface of a button due to the intricacy of the insignia and the difficulty in controlling the thicknesses of the light conducting layers in order to attain a desired lighting effect. The ability to achieve a desired lighting effect is often further complicated by the requirement for each backlit button to actuate an electrical switch beneath the button. Operation of the switch and efficient use of light sources often dictate that a light source cannot be located directly beneath a backlit button. Consequently, it can be difficult to deliver adequate light to each backlit button of a graphic display.

Even if adequate light can be delivered to each button, differences in adjacent insignia often result in irregular illumination intensities among the buttons of a backlit display group. This is particularly true if the buttons must share one or more light sources. To minimize costs, such groupings often use a minimum number of light sources, and incorporate light pipes for the purpose of distributing the light energy equally to each of the backlit buttons. Although much effort has been directed toward optimizing the design of light pipes, uniform backlighting of each and every button is very difficult due to size and location restraints. As a result, facets and painted patterns have often been applied to light pipes in order to increase the light intensity directed to relatively dim areas. If additional lamps are used, excessively bright areas must be attenuated with printed halftone patterns behind the individual insignia. While such tactics have been effective for flat screen printed displays, it is costly and poorly suited for buttons and other backlit components which are not flat and have low lighting intensities.

Accordingly, it would be desirable to provide a graphic display which is configured to eliminate the requirement for light sources, light pipes, and indicia formed on each button of the graphic display, such that the graphic display is significantly less complicated and less costly to produce than prior art graphic displays.

SUMMARY OF THE INVENTION

It is an object of this invention to provide a graphic display composed of a display lens and one or more backlit buttons.

It is a further object of this invention that the display lens and the backlit buttons are formed by an unitary light-conducting member.

It is another object of this invention that such a graphic display be equipped with an illuminated display which produces graphics for both the display lens and the buttons, so as to eliminate the requirement for insignia formed in the buttons and for light sources and light pipes for delivering light to the buttons.

It is yet another object of this invention that each button be equipped with an actuator for operating a switch.

In accordance with a preferred embodiment of this invention, these and other objects and advantages are accomplished as follows.

According to the present invention, there is provided a graphic display which is suitable for use in an instrument panel of an automobile. In particular, the graphic display includes a display lens and a number of backlit buttons which form a keypad, wherein both the display lens and the backlit buttons are illuminated by a single illuminated display located behind the lens and buttons. In accordance with this invention, the lens and buttons are formed by an integral light-conducting member disposed in front of the illuminated display. The buttons each pivotably project from the lens member. The integral light-conducting member is formed of an optically conductive material and is positioned relative to the illuminated display, such that the graphics generated by the illuminated display are visible through the lens member, and such that pivoting of each button actuates switches disposed adjacent the illuminated display. Preferably, the integral light-conducting member is positioned relative to the illuminated display such that the graphics generated by the illuminated display are also visible through each button member. A display housing is then positioned over the integral light-conducting member, such that the integral light-conducting member is secured between the illuminated display and the housing, and such that the graphics generated by the illuminated display are visible through apertures or windows formed in the housing.

In accordance with this invention, uniform backlighting intensity of the display is achieved by substituting graphics generated by the illuminated display for the prior art convention of using buttons having backlit insignia. Furthermore, the prior art requirement for a display lens which is formed separately from its associated buttons is eliminated by combining the functions of both into a single light-conducting member. As a result, a significant advantage of the present invention is that the display panel of this invention is relatively uncomplicated to manufacture and assembly, and thereby offers an attractive lower cost alternative to conventional backlit displays which employ multiple light sources and/or light pipes, and buttons on which insignia are formed.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

The present invention is directed toward a graphic display equipped with a keypad composed of a number of buttons. Such displays often serve as interior controls of an instrument panel of an automobile, such as an automobile's heating, ventilation and air conditioning (HVAC) system. The invention entails an improved graphic display which employs minimal components to achieve the same functionality of prior art graphic displays.

Figure 2:
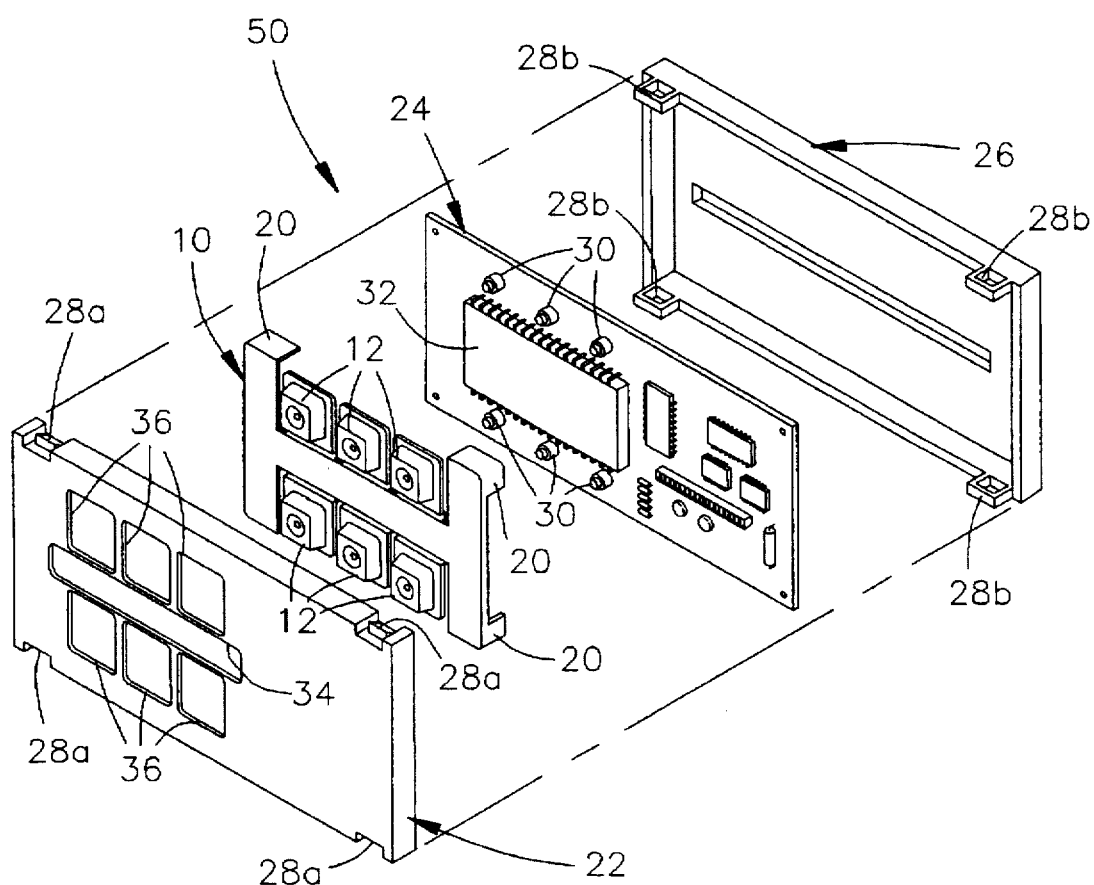
FIG. 2 is an exploded view of an electronic graphic display which incorporates the integral keypad and lens of FIG. 1.
Figure 3:
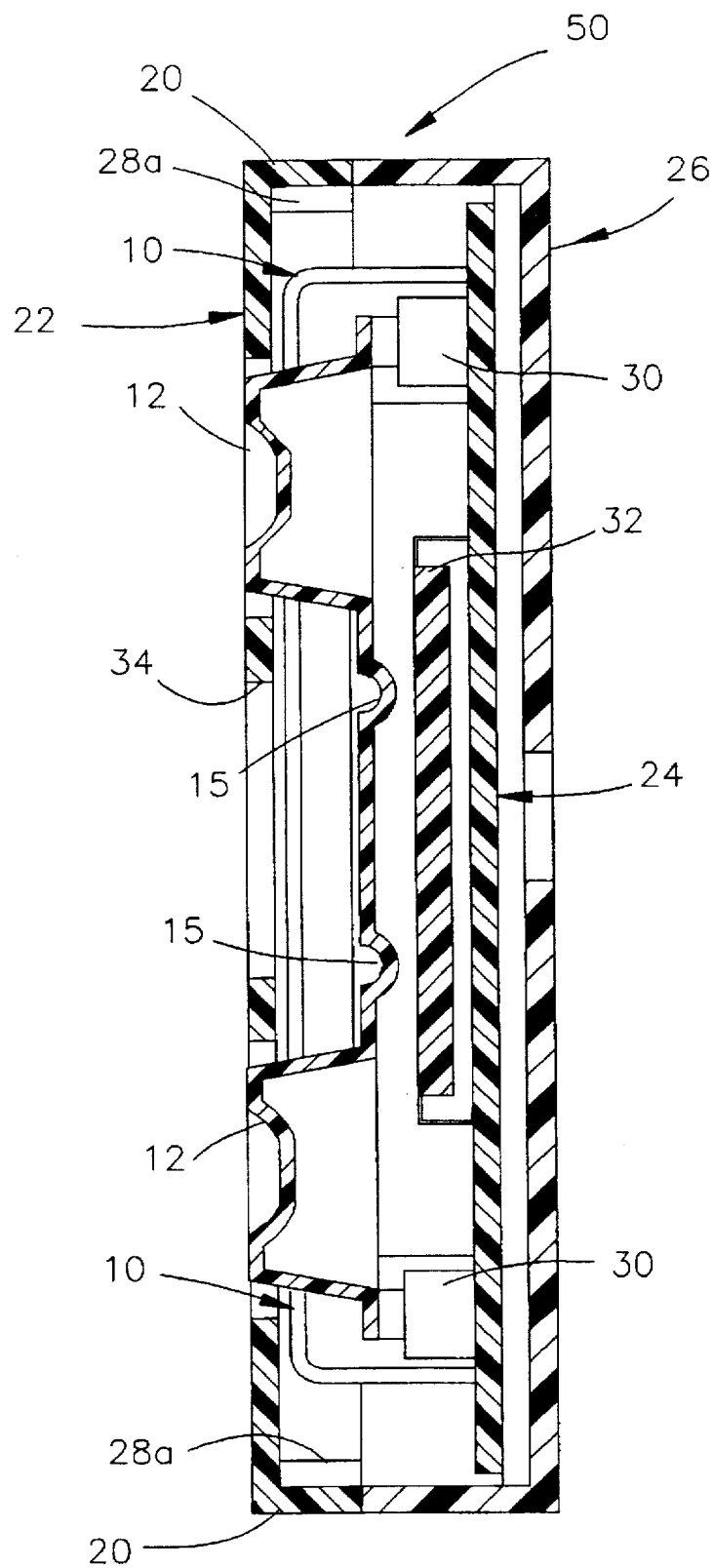
FIG. 3 is a cross-sectional view of the electronic graphic display of FIG. 2.

A graphic display 50 of a type suitable for the implementation of this invention is shown in FIGS. 2 and 3. For illustrative purposes, the display 50 is shown as having an exterior housing 22 in which a single display window 34 is positioned between two rows of button windows 36 which are each sized to receive a button 12. Those skilled in the art will recognize that the configuration shown in the Figures is merely one example of numerous possible arrangements, in which one or more display windows could be provided with any number of buttons. Therefore, the specific geometry of the display 50 is not generally a feature of this invention, and the numerous possible variations in its layout are generally within the knowledge and skill of those skilled in the art, as well as within the scope of this invention.

As shown in FIGS. 2 and 3, a preferred embodiment of the display 50 generally includes the housing 22 which delineates the display window 34 and the button windows 36, a circuit board assembly 24 which powers the display 50 and controls the information displayed, and a casing 26 which, in cooperation with the housing 22, encloses the circuit board assembly 24 to form a module. The casing 26 preferably has an integrally molded connector shroud (not shown) that enables external electrical connections to be made to pins (not shown) projecting from the circuit board assembly 24. As shown, detents 28a formed at the corners of the housing 22 interlock with tabs 28b formed in the casing 26 to secure the housing 22 to the casing 26, and simultaneously secure the circuit board assembly 24 within the module. The above components are generally of a type known in the art, and therefore do not require further explanation. Nor do the above components serve as limitations to the scope of this invention.

Figure 1:
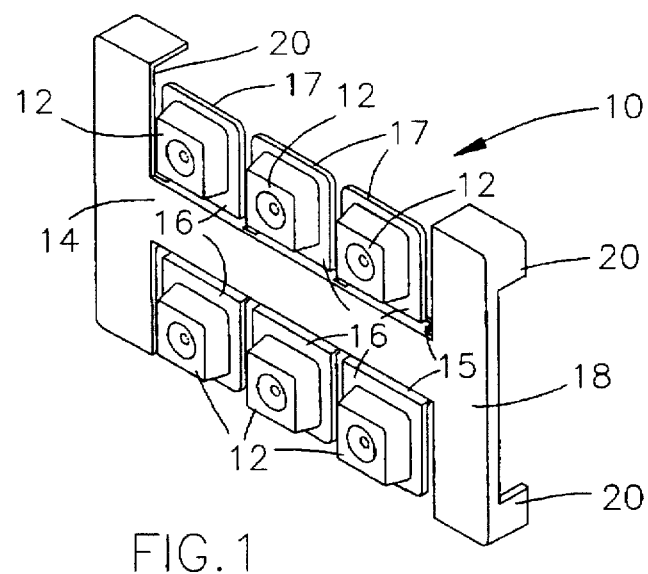
FIG. 1 illustrates in perspective an integral keypad and lens in accordance with a preferred embodiment of this invention.

As shown in FIGS. 2 and 3, the display 50 further includes an illuminated display 32 and an integral keypad 10, shown in greater detail in FIG. 1. In accordance with this invention, the keypad 10 uniquely combines a lens 14 through which information regarding the status of a system is displayed, and a number of buttons 12 through which information can be input to the circuit board 24 and the system controlled by the circuit board 24. Consequently, this invention is contrary to the conventional practice of forming discrete buttons that are entirely separate from the lens. The display 32 can be a vacuum fluorescent (VF) display, a liquid crystal display (LCD) or a display which utilizes light emitting diodes (LED). The display 32 serves to display graphics and information which will be viewed through the lens 14 and display window 34, as is generally known in the art.

However, the display 32 further serves to display the words, emblems and/or graphics which denote the function of each of the buttons 12. Consequently, this invention completely eliminates the prior art requirement for insignias which must be precisely formed in the exterior surface of each button 12. As such, this invention also eliminates the requirement for one or more light sources or light pipes to backlight the buttons 12 in order to illuminate their insignias.

To serve its dual functions, the keypad 10 must be formed from a light-conducting material, i.e., an optically translucent or transparent material. In addition, and as shown in FIG. 1, the keypad 10 is physically configured such that each button 12 is cantilevered from the lens 14 and flexibly attached to the lens 14 through a hinge 15. The cross-sectional thickness of each hinge 15 is preferably less than that of the remainder of the keypad 10 so as to concentrate flexing of the buttons 12 at their respective hinges 15. Each button 12 is preferably composed of a raised surface which projects above a flange 16 that circumscribes the button 12.

The distal end of each button 12 forms an actuator 17 for actuating a switch 30 provided on the circuit board assembly 24. By pressing a button 12 through a window 36 in the housing 22, the button 12 will rotate about its hinge 15, and thereby actuate its corresponding switch 30 with its actuator 17. In order to space the keypad 10 from the circuit board assembly 24, the switches 30 and the display 32, the keypad 10 preferably includes a base formed by legs 20 which project from each end 18 of the keypad 10. As assembled, the actuators 17 may abut their respective switches 30 or be spaced some distance from the switches 30.

While the switches 30 are shown in FIGS. 2 and 3 as being located adjacent the display 32 and immediately behind the buttons 12, it is foreseeable that the switches 30 could be offset or spaced further from the display 32 or the buttons 12, necessitating that the actuators 17 be formed by more distinct or salient features of the buttons 12. Those skilled in the art will recognize that the switches 30 represented in the Figures could have numerous possible configurations. The construction and operation of the switches 30 are not features of this invention, and the numerous possible variations in their design are generally within the knowledge and skill of those skilled in the art.

In a preferred embodiment, the keypad 10 is formed by an injection molding process from a translucent polymeric material, such as an acrylic or a polycarbonate, though other suitable polymeric materials could foreseeably be used. For purposes of this invention, the buttons 12 and lens 14 must be sufficiently translucent in order to have a suitable light transmission capability, so as to enable the graphics generated by the display 32 to be clearly visible through the windows 34 and 36 of the housing 22. For purposes of contributing a filtering and/or tinting effect, at least those portions of the keypad 10 which form the lens 14 and buttons 14 can be tinted to achieve a desired filter color through appropriate resin selection. In this manner, the keypad 10 can be formulated such that the lens 14 forms an optic filter for the display 32.

Because the physical configuration of the keypad 10 can be varied considerable from that shown yet retain the advantages of this invention, it is foreseeable that other configurations could be adopted. For example, the buttons 12 need not be formed to be substantially coplanar with the lens 14, as illustrated in the Figures. Under most circumstances, configurations which can be formed as a unitary member during a single molding operation are generally preferred. However, it is foreseeable that multiple operations could be employed to form the keypad 10, particularly if the keypad 10 has a relatively complex shape or requires regions having different light conducting characteristics.

In use, each of the buttons 12 is adapted to deflect when pressed, with the motion of the buttons 12 being primarily rotation relative to the lens 14 about an axis defined by its hinge 15. As the button 12 rotates, the corresponding switch 30 is actuated by the button's actuator 17, thereby inputing information into the system which is controlled by the circuit board assembly 24, and whose status is indicated through the lens 14 of the graphic display 50. Movement of the entire keypad 10, including the lens 14 and the remaining buttons 12, is resisted by the rigidity of the keypad 10, which is preferably thinner in cross-section at the hinges 15 than in its other regions, such as the lens 14, the ends 18 and the legs 20.

As is apparent from the above description, the dual function of the keypad 10 advantageously provides for a graphic display 50 whose construction is greatly simplified by eliminating the requirement for one or more light sources or light pipes and for the formation of an insignia on each of the buttons 12. Yet in its simplified form, the graphic display 50 is characterized by uniform lighting intensities between adjacent buttons 12 because a single display 32 generates the backlighting, instead of multiple light sources and light pipes. Accordingly, a pleasing overall appearance can be reliably achieved with the graphic display 50 of this invention at a cost less than that possible with prior art displays that are similarly equipped with buttons.

Accordingly, the present invention provides a graphic display characterized by a uniform backlighting intensity while avoiding the prior art convention of using buttons having insignia that are backlit by light sources or light pipes, and eliminating the use of a separately formed display and buttons. As a result, a significant advantage of the present invention is that a display panel is provided which is relatively uncomplicated to manufacture and assembly, and thereby offers an attractive lower cost alternative to conventional backlit graphic displays.

While our invention has been described in terms of a preferred embodiment, it is apparent that other forms could be adopted by one skilled in the art—for example by adopting display configurations which differ from that shown, or by substituting appropriate materials. Accordingly, the scope of our invention is to be limited only by the following claims.

The embodiments of the invention in which an exclusive property or privilege is claimed are defined as follows:

1. An integral member for a backlit graphic display, the integral member being a unitary integrally-formed body of an optically conductive material, the integrally-formed body comprising an integrally-formed lens member and an integrally-formed button member cantilevered from the lens member by a hinge integrally formed with the lens member and button member, the button member being rotatably coupled to the lens member with the hinge so as to rotate relative to the lens member about an axis defined by the hinge.

2. An integral member as recited in claim 1 wherein the integral member comprises at least two button members cantilevered from opposite edges of the lens member, such that the lens member is between the at least two button members.

3. An integral member as recited in claim 1 wherein a distal end of the button member forms an actuator.

4. An integral member as recited in claim 1 wherein the button member is substantially coplanar with the lens member.

5. An integral member as recited in claim 1 wherein the lens member is an optic filter.

6. A backlit graphic display comprising:

an illuminated display for generating graphics;

a switch disposed adjacent the illuminated display;

an integral member disposed in proximity to the illuminated display, the integral member being a unitary integrally-formed body of an optically conductive material and comprising a lens member and a button member pivotably cantilevered from the lens member, the integral member being positioned relative to the illuminated display and the switch such that the graphics generated by the illuminated display is visible through the lens member and such that pivoting of the button member relative to the lens member actuates the switch; and a housing having apertures formed therein, the integral member being disposed between the illuminated display and the housing such that the graphics generated by the illuminated display are visible through the apertures.

7. A backlit graphic display as recited in claim 6 wherein the integral member is positioned relative to the illuminated display such that the graphics generated by the illuminated display is visible through the button member.

8. A backlit graphic display as recited in claim 6 wherein the integral member comprises at least two button members pivotably cantilevered and projecting from opposite edges of the lens member, such that the lens member is between the at least two button members.

9. A backlit graphic display as recited in claim 6 further comprising a hinge pivotably attaching the button member to the lens member.

10. A backlit graphic display as recited in claim 6 wherein the integral member further comprises an actuator disposed adjacent the button member, the actuator being positioned relative to the switch such that the actuator actuates the switch when the button is pivoted relative to the lens member.

11. A backlit graphic display as recited in claim 10 wherein the actuator is formed by a distal end of the button member disposed opposite the lens member.

12. A backlit graphic display as recited in claim 6 wherein the button member is substantially coplanar with the lens member.

13. A backlit graphic display as recited in claim 6 wherein the integral member is an integrally-molded keypad.

14. A backlit graphic display comprising:

an illuminated display for generating graphics;

a plurality of switches disposed adjacent the illuminated display;

a unitary integrally-formed light-conducting member formed of an optically conductive material, the integrally-formed light-conducting member comprising:

a base;

a lens member supported by the base;

a plurality of button members pivotably cantilevered from the lens member, the plurality of button members being substantially coplanar with the lens member; and a plurality of actuator members, each of the plurality of actuators projecting from a corresponding one of the plurality of button members such that each of the plurality of actuator members is disposed adjacent a corresponding one of the plurality of switches so as to actuate the corresponding one of the plurality of switches when the corresponding one of the plurality of button members is pivoted relative to the lens member;

wherein the integrally-formed light-conducting member is positioned relative to the illuminated display such that the graphics generated by the illuminated display is visible through the lens member and the plurality of button members; and a housing having apertures formed therein, the integrally-formed light-conducting member being disposed between the housing and the illuminated display such that the graphics generated by the illuminated display are visible through the apertures.

15. A backlit graphic display as recited in claim 14 wherein at least two button members of the plurality of button members are pivotably cantilevered from opposite edges of the lens member, such that the lens member is between the at least two button members.

16. A backlit graphic display as recited in claim 14 wherein each of the plurality of actuators is formed by a distal end of the corresponding one of the plurality of button members, each of the distal ends being disposed opposite the lens member.

17. A backlit graphic display as recited in claim 14 wherein the integrally-formed light-conducting member is an integrally-molded keypad.

18. A backlit graphic display as recited in claim 14 further comprising a circuit board disposed behind the illuminated display, the plurality of switches and the illuminated display being mounted to the circuit board.

* * * * *